(12) United States Patent
Chen et al.

(10) Patent No.: US 8,205,895 B2
(45) Date of Patent: Jun. 26, 2012

(54) SWINGABLE AND SPEEDABLE FREEWHEELED VEHICLE

(76) Inventors: Jhe-Wei Chen, Kaohsiung County (TW); Min-Hua Yang, Kaohsiung County (TW); Feng-Rong Wu, Kaohsiung County (TW)

( * ) Notice: Subject to any disclaimer, the term of this patent is extended or adjusted under 35 U.S.C. 154(b) by 342 days.

(21) Appl. No.: 12/641,886

(22) Filed: Dec. 18, 2009

(65) Prior Publication Data
US 2011/0127739 A1 Jun. 2, 2011

(30) Foreign Application Priority Data
Nov. 30, 2009 (TW) ................................ 98222409 U (51) Int. Cl.
*B62M 1/00* (2010.01)
(52) U.S. Cl. ................................. 280/87.041; 280/87.01
(58) Field of Classification Search ............... 280/1.181, 280/1.191, 87.01, 87.021, 87.041, 87.043, 280/200, 220, 221, 252
See application file for complete search history.

(56) References Cited

U.S. PATENT DOCUMENTS

| RE32,031 | E  | * | 11/1985 | Winchell | 280/282 |
| 6,474,660 | B1 | * | 11/2002 | Warren | 280/7.12 |
| 6,485,039 | B1 | * | 11/2002 | Ming-Fu | 280/87.041 |
| 6,719,310 | B1 | * | 4/2004 | Lin | 280/87.041 |
| 7,549,655 | B2 | * | 6/2009 | Fan | 280/87.041 |
| 2010/0234186 | A1 | * | 9/2010 | Fan | 482/51 |

* cited by examiner

*Primary Examiner* — John Walters
(74) *Attorney, Agent, or Firm* — Muncy, Geissler, Olds & Lowe, PLLC (57) ABSTRACT

A swingable and speedable freewheeled vehicle includes a swingable device installed between a frame and each rear wheel. The swingable device has a guiding track fixed to a seated member, a spindle pivoted on said seated member, and a sliding assembly for sliding along the guiding track. Thereby, while driving the freewheeled vehicle via swinging, a sliding stem of the sliding assembly would slide along the guiding track and subject to an inertial force. Accordingly, a distance between the ground and the frame would be varied commensurately with the freewheeled vehicle moving along with the inertia force during the sliding so as to readily and speedily motivate the freewheeled vehicle forwards.

7 Claims, 8 Drawing Sheets

SWINGABLE AND SPEEDABLE FREEWHEELED VEHICLE

BACKGROUND OF THE INVENTION

1. Field of the Invention

The present invention relates to a vehicle, particularly to a swingable and speedable freewheeled vehicle.

2. Description of the Related Art

Figure 1:
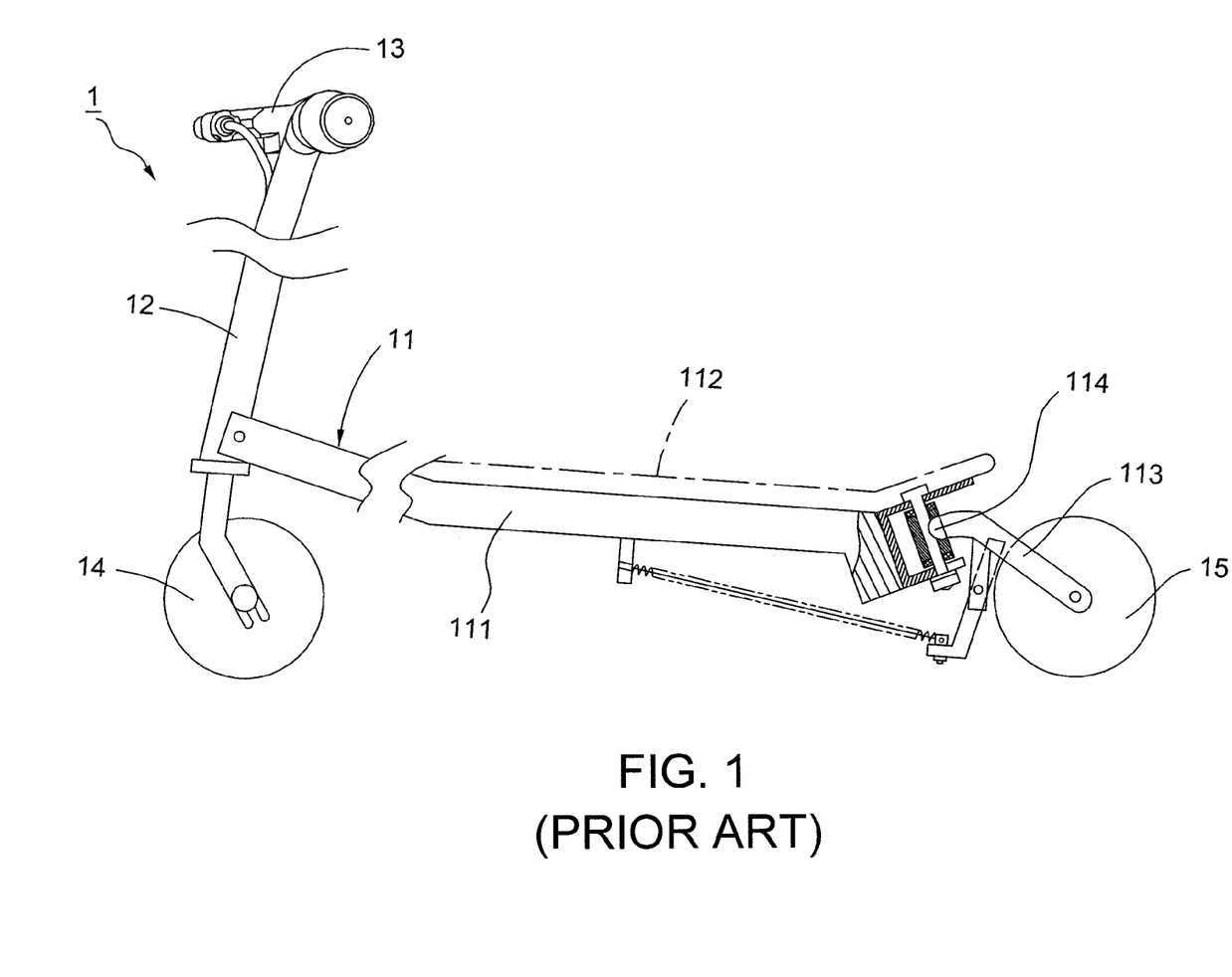
FIG. 1 is a schematic view showing the conventional freewheeled vehicle.
Figure 2:
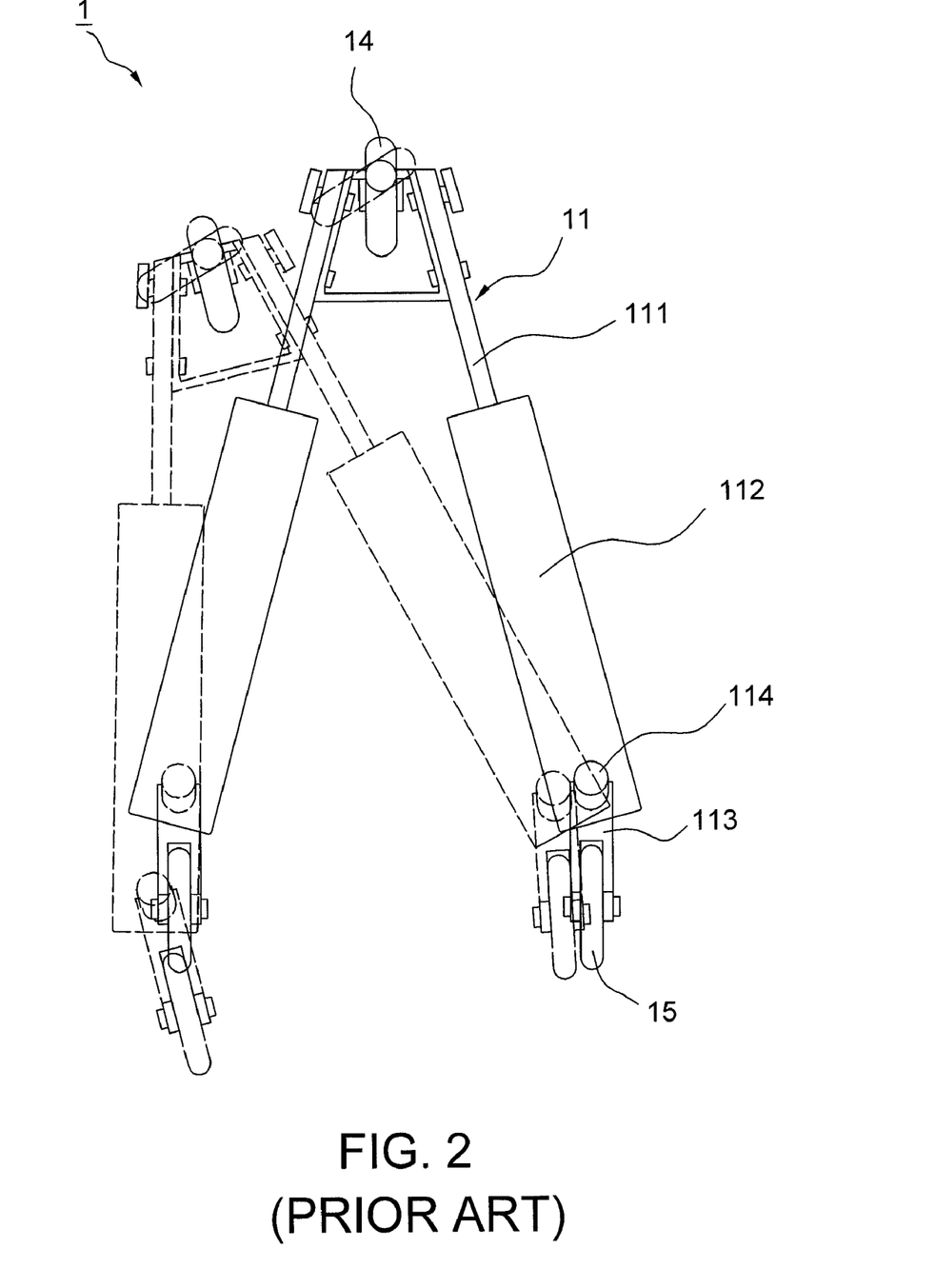

FIGS. 1 and 2 show "An Improvement on A Freewheeled Vehicle" issued by an R.O.C. Patent No. M322912. The freewheeled vehicle 1 comprises a frame 11, a fixture 12 pivotally disposed on one end of the frame 11, a steering stem 13 disposed on the fixture 12, front and rear wheels 14, 15 respectively installed on the frame 11. The frame 11 includes two holding rods 111 respectively extending from the fixture 12, and a pedal 112 individually installed on each holding rod 111. Each of the holding rods 111 has a fork member 113 connected to the rear wheel 15, and a spindle 114 pivoted on the holding rod 111 and connected to the fork member 113. According, when the driver steps on the pedals 112 and swings his body to drive the fork member 113 to sway rightward and leftward, the rear wheels 15 would thence rotate to move the freewheeled vehicle 1 forward.

However, problems and difficulties may be encountered with the above conventional structures as follows:

1. While moving the freewheeled vehicle 1, the rear wheels 15 would be accordingly swung. Thus, if drivers want to speed up the vehicle, they have to exert their swinging strength on the rear wheels 15 harder. However, at the same time, drivers could readily lose their balance on the freewheeled vehicle 1 because of casual or improper strength exertion. As a result, people would raise a safety concern about the conventional freewheeled vehicle 1. Since drivers could not enjoy their driving due to the unstable balance, drivers would lose interest in the freewheeled vehicle 1, and an exercising effect would be reduced.

2. When the freewheeled vehicle 1 is not being driven, the fork member 113 and the spindle 114 are not structurally constricted. Therefore, if users move the freewheeled vehicle 1 backwards, the fork member 113 easily slants aside at the time of moving. The rear wheels 15 and the front wheel 14 would not have a consistent running direction, which results in an inconvenient moving manner.

SUMMARY OF THE INVENTION

The object of the present invention is to provide a swingable and speedable freewheeled vehicle, which could be readily speeded up to promote the fun of using and the effect of exercising.

The swingable and speedable freewheeled vehicle in accordance with the present invention comprises a frame, a fixture pivotally disposed on one end of the frame, a steering stem fixed to the fixture, front and rear wheels respectively installed to the frame and the fixture, and swingable devices being installed between the frame and the rear wheels. Each swingable device includes a guiding track fixed to a seated member, a spindle pivoted on the seated member, and a sliding assembly for sliding on the guiding track. Thereby, while swingably driving the freewheeled vehicle, a sliding stem of the sliding assembly would slide along the guiding track to perform a high-low displacement. Accordingly, a variation of distance between the ground and the frame would provide the freewheeled vehicle with an inertia force during the sliding. Thus, drivers employ a pushing power from the inertia force to readily and speedily motivate the freewheeled vehicle forwards so as to increase their using interests and exercising effect.

An object of the invention is to provide a swingable and speedable freewheeled vehicle that comprises a frame, a fixture pivotally disposed on one end of the frame, a steering stem disposed on the fixture, front and rear wheels respectively fixed to the frame and the fixture, and swingable devices respectively installed between the frame and the rear wheels.

Two holding rods are respectively extended from the fixture, and a seated member is fixed to each end of the holding rods. Further, a pedal is mounted on each of the holding rods, and two handlebars are formed on the steering stem for controlling a moving direction of the vehicle.

Each of the swingable devices includes a guiding track fixed to the seated member, a spindle pivoted on the seated member, and a sliding assembly for sliding on the guiding track. The sliding assembly has a sliding stem with one end thereof pivoted on the spindle and with the other end thereof pivoted on the rear wheel as well as a rotary member penetrated by the sliding stem. The rotary member props against the guiding track and slides thereon.

Preferably, the guiding track is disposed inclined with respect to the ground.

Preferably, a guiding groove is defined on the rotary member corresponding to the sliding stem for the rotary member to stably prop against the guiding track.

Preferably, the front and rear wheels are replaced by a set of ice skates.

Preferably, a power device is installed on the front wheel which is -automatically driven thereby.

The advantages of the present invention over the known prior arts will become more apparent to those of ordinary skilled in the art upon reading the following descriptions in junction with the accompanying drawings.

BRIEF DESCRIPTION OF THE DRAWINGS

FIG. 2 is a schematic view showing FIG. 1 in use;

DETAILED DESCRIPTION OF THE PREFERRED EMBODIMENTS

Figure 3:
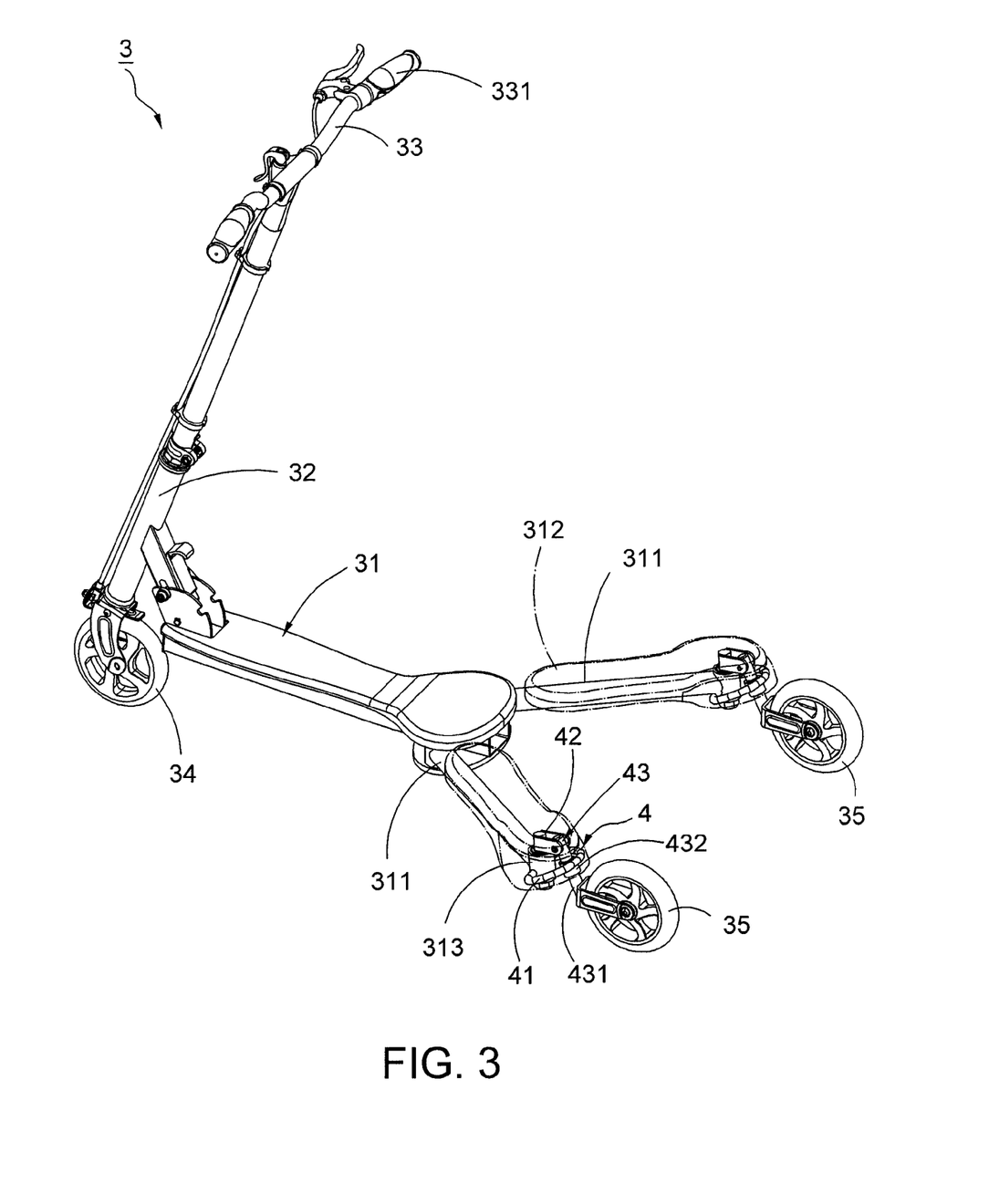
FIG. 3 is a perspective view showing a first preferred embodiment of the present invention.

FIG. 3 shows a first preferred embodiment of the present invention. A freewheeled vehicle 3 allows for readily swinging and speeding up, comprising a frame 31, a fixture 32 pivotally disposed on one end of the frame 31, a steering stem 33 fixed to the fixture 32, front and rear wheels 34, 35 respectively installed on the frame 31 and the fixture 32, and swingable devices 4 respectively disposed between the frame 31 and the rear wheels 35. The frame 31 has two holding rods 311 respectively extended from the fixture 32, a seated member 313 fixed to an end of each holding rod 311, and a pedal 312 installed on each holding rod 311. In addition, the steering stem 33 forms two handlebars 331 thereon for controlling the moving direction of the front wheel 34.

Figure 4:
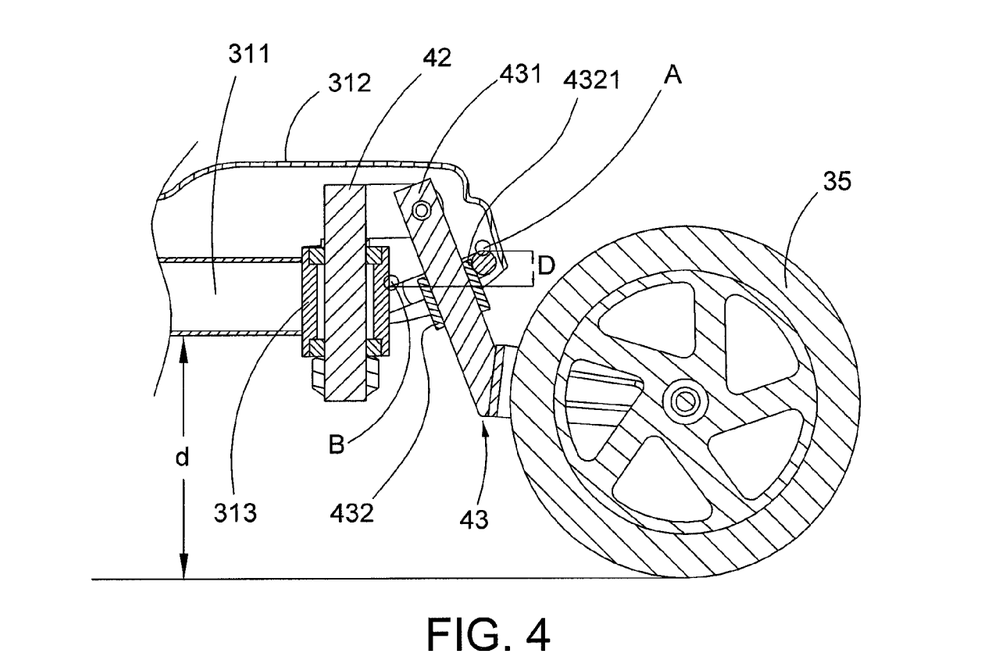
FIG. 4 is an enlarged view of elements in the first embodiment.

In FIGS. 3 and 4, the swingable device 4 includes a guiding track 41 fixed to the seated member 313, a spindle 42 pivoted on the seated member 313, and a sliding assembly 43 for sliding along the guiding track 41. The sliding assembly 43 includes a sliding stem 431 with its one end pivoted on the spindle 42 and with its other end pivoted on the rear wheel 35, and a rotary member 432 penetrated by the sliding stem 431. The rotary member 432 props against the guiding track 41 for sliding thereon. Additionally, the guiding track 41 is preferably structured to be inclined with respect to the ground. Herein, the guiding track 41 further has an upmost point A defined thereon and two lowest points B respectively defined at two sides of the guiding track 41. Accordingly, while a vertical distance D between the upmost point A and the lowest points B is larger, a greater sliding inertia force and motive force impinging on the sliding assembly 43 would be brought about whereby, the freewheeled vehicle 3 would sustain a preferable pushing force. Further, a guiding groove 4321 is preferably defined on the rotary member 432 corresponding to the sliding stem 431, so that the rotary member 432 could more firmly prop against and slide on the guiding track 41.

Figure 5:
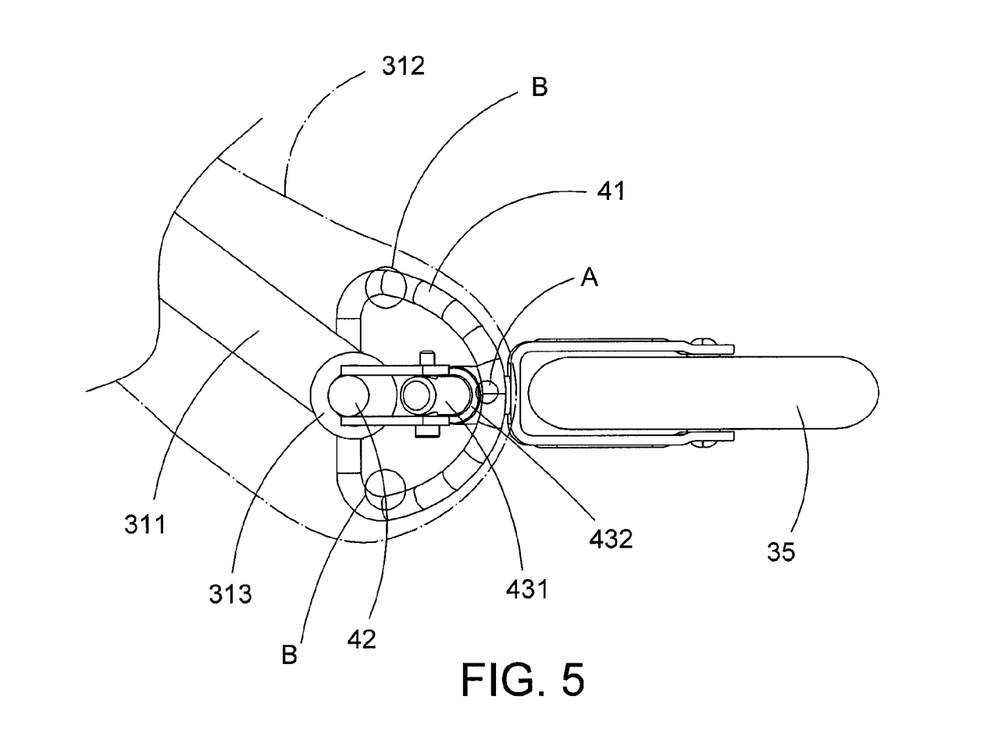
FIG. 5 is a top view of the elements in the first embodiment.

Referring to FIGS. 3 and 5, while the freewheeled vehicle 3 is placed on the ground, a balance between the weight of the frame 31 and the rear wheels 35 allows the rotary member 432 to be located on the upmost point A of the guiding track 41. At the same time, the rear wheels 35 and the front wheel 34 have a coherent placing manner Accordingly, if drivers tend to move the freewheeled vehicle 3, the rear wheels 35 would not go aside, which favorably prevents an inconvenient motion. Further referring to FIGS. 6 and 7, in use, drivers stand on the pedals 312 with their swinging motions to carry the holding rods 311 moving leftwards and rightwards reciprocally. Concurrently, the rotary member 432 would slide forth and backward between the two lowest points B on the guiding track 41. When the rotary member 432 reaches one of the lowest points B and the driver keeps swinging, the rotary member 432 would further slide toward the other lowest point B for concurrently allowing the rear wheels 35 to sway with a certain angle. Notably, during the swaying of the rear wheels 35, a torsion would be accordingly generated between the ground and the vehicle. Concomitantly, upon the rotary member 432 sliding over the upmost point A toward the lowest points B, a certain strength is generated for driving the rotary member 432 to move from a higher place to a lower place and accordingly varying the distance d between the frame 31 and the ground. Thus, by means of the certain strength providing a pushing force and the rotary member 432 providing a swingably moving force, the freewheeled vehicle 3 could be stably moved.

Figure 6:
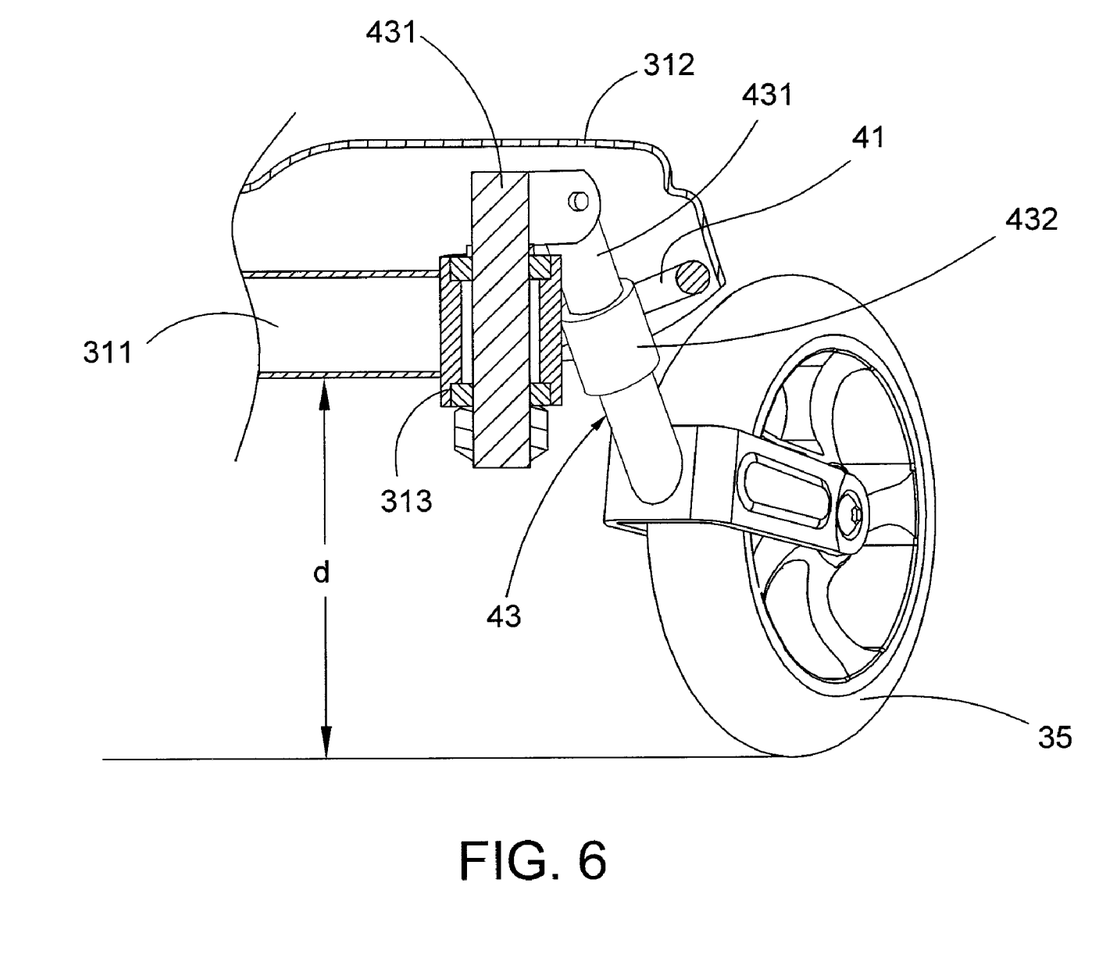
FIG. 6 is a schematic view showing the first embodiment in use.
Figure 7:
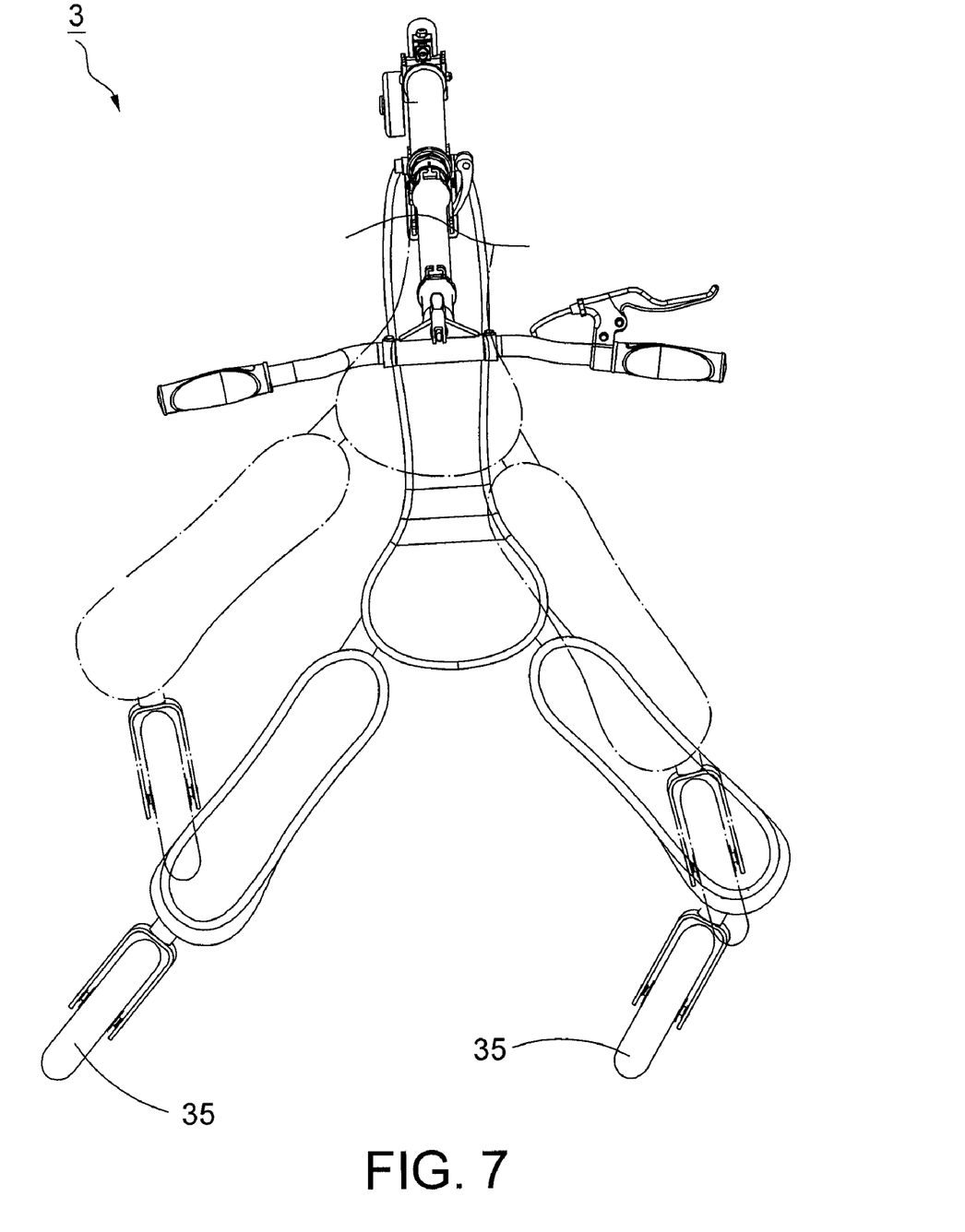
FIG. 7 is a schematic view showing the first embodiment in use.

Still further, at the time of swinging, the rotary member 432 would slide from either lowest point B toward the upmost point A on the guiding track 41. Concurrently, the holding rods 311 would be accordingly lifted along with the sliding of the sliding stem 431 on the guiding track 41. Thereby, a distance d between the holding rods 311 would be further away from the ground accordingly so as to enhance a moving force thereof. When the rotary member 432 slides to the lowest point B, the motion of the rotary member 432 would be restricted. Since the rear wheels 35 and the holding rods 311 still sustain the strength exerted from the driver, the weight of the driver would thence turn into a returning force for sliding the rotary member 432 from the lowest point B toward the upmost point A on the guiding track 41. When the rotary member 432 reaches the upmost point A on the guiding track 41, an inertia force would be accumulated, which leads to the rotary member 432 successively moving along the guiding track 41 toward the other lowest point B. Therefore, drivers could employ the inertia force to easily and swiftly carry the freewheeled vehicle 3 frontward, thereby increasing the riding enjoyment and exercising effect. Additionally, the strength exerted by the driver on the vehicle could further reinforce the inertia force of the rotary member 432 sliding on the guiding track 41, so that the driver employs his strength to cooperate with the swing direction of the vehicle for achieving a speedy movement, and the occurrence of unstable balance during the acceleration would be avoided to promote safety.

Figure 8:
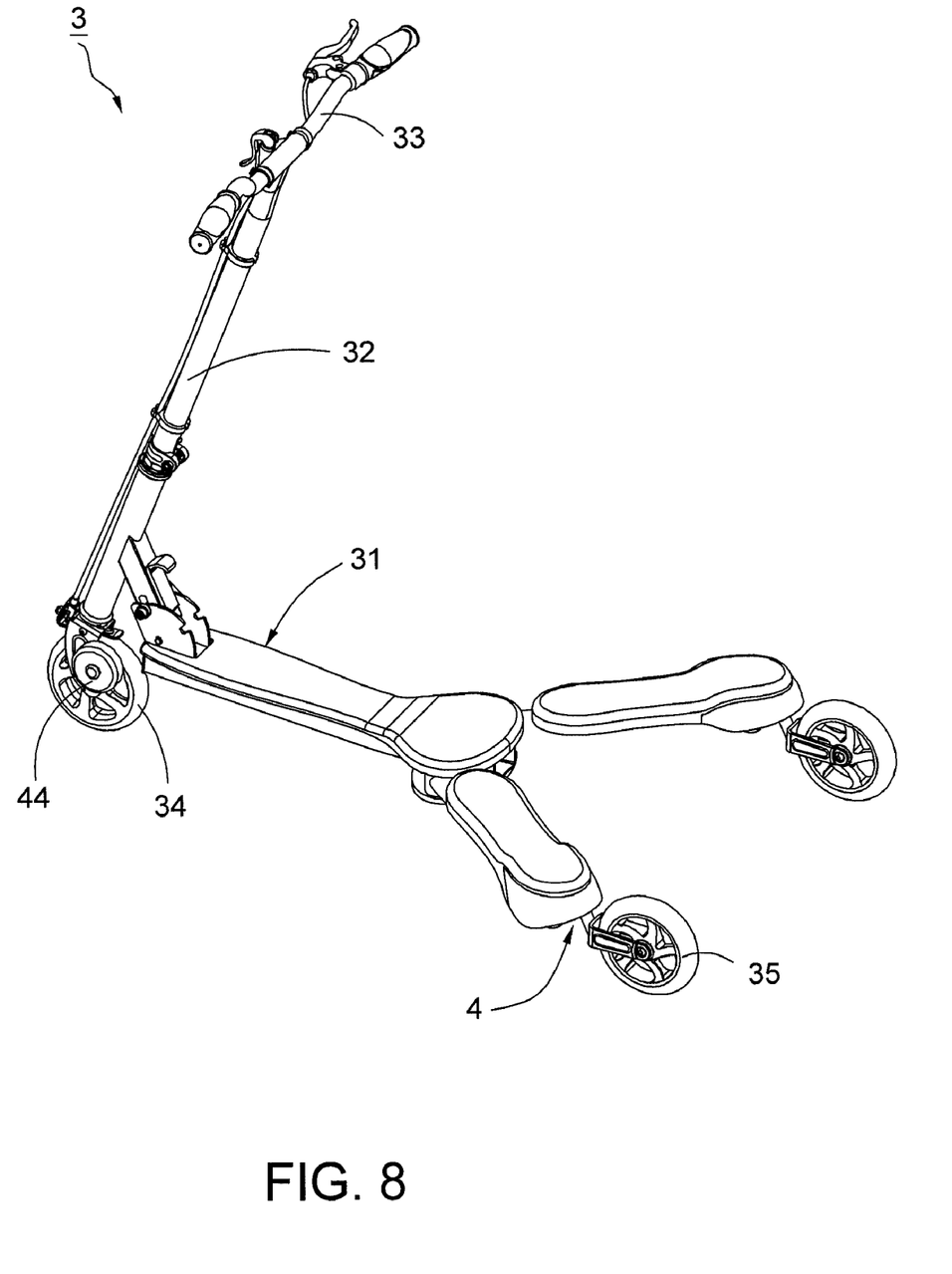
FIG. 8 is a perspective view showing a second preferred embodiment of the present invention.

Referring to FIG. 8, which shows a second preferred embodiment of the present invention, the freewheeled vehicle 3 still comprises the frame 31, the fixture 32, the steering stem 33, the front and rear wheels 34, 35, and the swingable devices 4. Particularly, a power device 44 connected to the front wheel 34 is installed on the frame 31 for assisting the automatic rotation of the front wheel 34. Accordingly, the freewheeled vehicle 3 could be driven forward without self-swinging for promoting the interest in riding the freewheeled vehicle. As it should be, when drivers manually exert their strength to swing the freewheeled vehicle 3 and concurrently drive the same via the power device 44, an easier and speedy riding with amusement could be attained.

Figure 9:
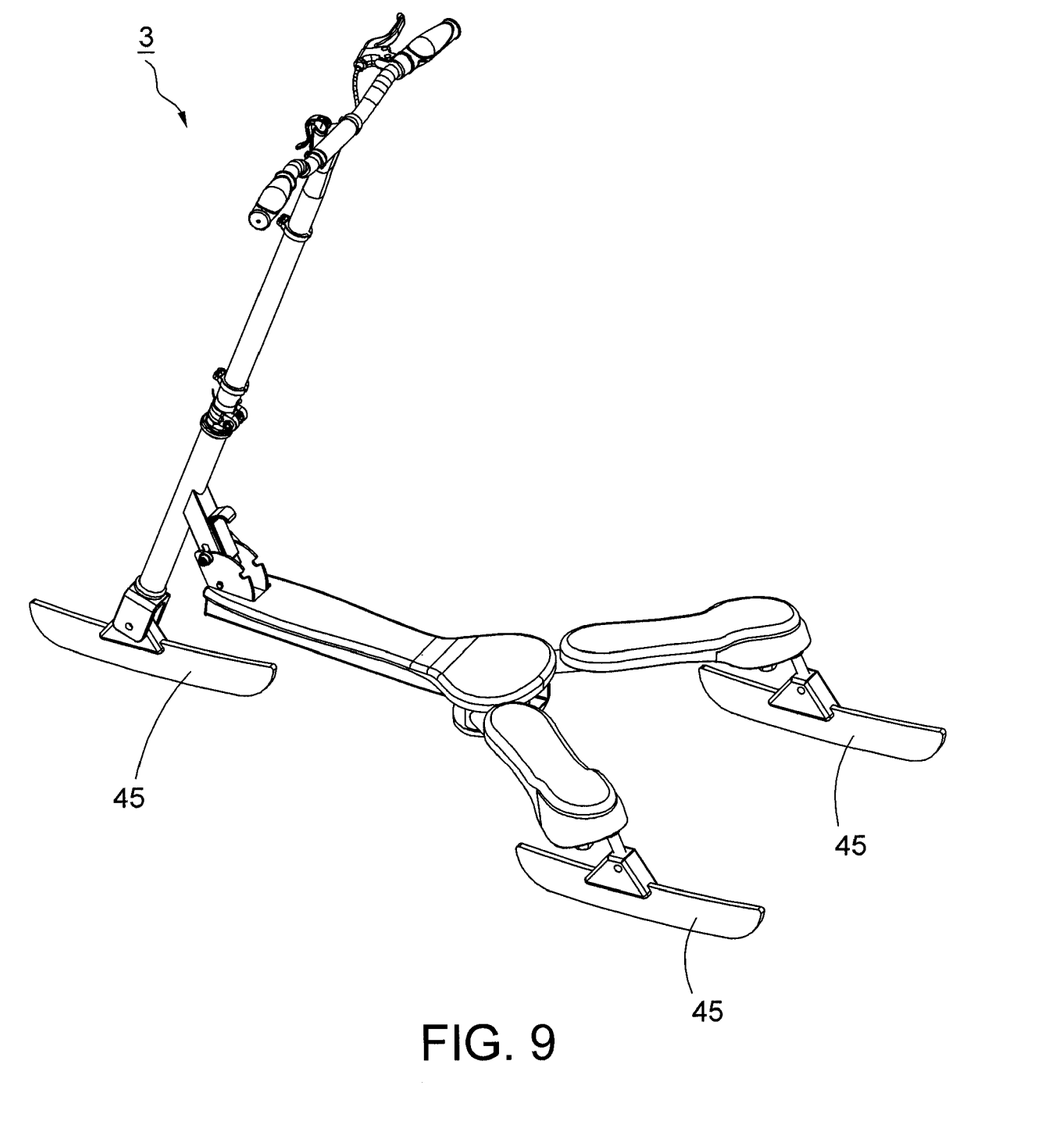
FIG. 9 is a perspective view showing a third preferred embodiment of the present invention.

Referring to FIG. 9, which shows a third preferred embodiment of the present invention, the similar elements and correlations to those of the first embodiment are herein omitted. The front and rear wheels 34, 35 in FIG. 3 could be replaced by ice skates 45. Thereby, the freewheeled vehicle 3 could be skied on any frozen ground for enjoying ice-skating indoors and outdoors. Therefore, drivers could slide the freewheeled vehicle 3 unlimitedly. Moreover, safety, amusement effect and application interests are all preferably promoted.

To sum up, the present invention takes advantage of the swingable devices to generate a suitable inertia force at the time of the sliding stem of the sliding assembly moving along the guiding track via drivers stepping and swinging the freewheeled vehicle. Accordingly, drivers utilize the inertia force to perform a high-low displacement of the frame and allow a variation of distance between the frame and the ground, so that the freewheeled vehicle could be readily and swiftly moved forward to increase the using interests and exercising effects. The incident of inclination of the vehicle due to the unstable balance could also be avoided to increase safety.

While we have shown and described the embodiment in accordance with the present invention, it should be clear to those skilled in the art that further embodiments may be made without departing from the scope of the present invention.

What is claimed is:

1. A swingable and speedable freewheeled vehicle comprising:
   a frame,
   a fixture pivotally disposed on one end of said frame,
   a steering stem disposed on said fixture,
   front and rear wheels respectively fixed to said frame and said fixture,
   swingable devices respectively installed between said frame and said rear wheels;
   two holding rods respectively extending from said fixture,
   a seated member fixed to each end of said holding rods,
   a pedal mounted on each of said holding rods;
   two handlebars on said steering stem for controlling a moving direction of said vehicle;

each of said swingable devices including a guiding track fixed to said seated member, a spindle pivoted on said seated member, and a sliding assembly for sliding on said guiding track; and said sliding assembly having a sliding stem with one end thereof pivoted on said spindle and with the other end thereof pivoted on said rear wheel, and a rotary member penetrated by said sliding stern; said rotary member propping against said guiding track and sliding thereon.

2. The freewheeled vehicle as claimed in claim 1, wherein said guiding track is disposed inclined with respect to the ground.

3. The freewheeled vehicle as claimed in claim 1, wherein a guiding groove is defined on said rotary member corresponding to said sliding stem for said rotary member to stably prop against said guiding track.

4. The freewheeled vehicle as claimed in claim 3, wherein said front and rear wheels are replaced by a set of ice skates.

5. The freewheeled vehicle as claimed in claim 3, wherein a power device is installed on said front wheel which is automatically driven thereby.

6. The freewheeled vehicle as claimed in claim 1, wherein said front and rear wheels are replaced by a set of ice skates.

7. The freewheeled vehicle as claimed in claim 1, wherein a power device is installed on said front wheel which is automatically driven thereby.

* * * * *